(12) United States Patent
Rosenfeld

(10) Patent No.: US 7,453,394 B2
(45) Date of Patent: Nov. 18, 2008

(54) METHOD OF POSITION DETERMINATION

(75) Inventor: Josi Rosenfeld, London (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 123 days.

(21) Appl. No.: 10/573,719

(22) PCT Filed: Sep. 24, 2004

(86) PCT No.: PCT/IB2004/051845

§ 371 (c)(1),
(2), (4) Date: Mar. 27, 2006

(87) PCT Pub. No.: WO2005/031384

PCT Pub. Date: Apr. 7, 2005

(65) Prior Publication Data

US 2007/0075901 A1    Apr. 5, 2007

(30) Foreign Application Priority Data

Sep. 27, 2003  (GB) ................... 0322685.9

(51) Int. Cl.
  *G01S 1/00* (2006.01)
  *G01S 3/16* (2006.01)
  *G01S 3/28* (2006.01)
(52) U.S. Cl. ................. 342/357.02; 342/378
(58) Field of Classification Search ................. 342/357.01–357.17
  See application file for complete search history.

(56) References Cited

U.S. PATENT DOCUMENTS

| | | | | | |
|---|---|---|---|---|---|
| 5,663,734 | A | * | 9/1997 | Krasner ................. | 342/357.12 |
| 5,943,363 | A | * | 8/1999 | Hanson et al. ............. | 375/150 |
| 6,671,340 | B1 | * | 12/2003 | Kroeger et al. ............. | 375/350 |
| 7,236,883 | B2 | * | 6/2007 | Garin et al. ................. | 701/213 |
| 2001/0036223 | A1 | * | 11/2001 | Webster et al. ............. | 375/152 |
| 2002/0025011 | A1 | * | 2/2002 | Sullivan ..................... | 375/343 |

(Continued)

FOREIGN PATENT DOCUMENTS

EP    0 654 677    5/1995

(Continued)

OTHER PUBLICATIONS

Lian, Adaptive Antenna Arrays satellite Personal Communications Systems, Virginia Technology, 1997, Chap 4, p. 53, Chap 5, p. 67 http://scholar.lib.vt.edu/theses/public/etd-74181839751071/etd.pdf.*

(Continued)

*Primary Examiner*—Thomas H. Tarcza
*Assistant Examiner*—Harry Liu
(74) *Attorney, Agent, or Firm*—Michael E. Belk

(57) ABSTRACT

A device includes an antenna for receiving an incoming signal. A multiplier multiplies the incoming signal with an output from a carrier generator in order to mix down signal the incoming signal. The output of the multiplier is provided to correlators for sequential correlation with a replica code of the mixed down signal provided from a code generator, in order to produce correlation data including I (imaginary) and Q (real) channels. The correlation data is then passed to a signal processor which adjusts appropriately both the code generator and the carrier generator to provide accurate position measurement in indoor environments with multiple diffuse reflections.

12 Claims, 4 Drawing Sheets

U.S. PATENT DOCUMENTS

| | | |
|---|---|---|
| 2003/0012266 A1 | 1/2003 | Gilmour |
| 2005/0036539 A1* | 2/2005 | Niederholz et al. .......... 375/150 |
| 2005/0100076 A1* | 5/2005 | Gazdzinski et al. .......... 375/130 |
| 2006/0029164 A1* | 2/2006 | Hwang ........................ 375/340 |
| 2006/0092882 A1* | 5/2006 | Ghosh et al. ................. 370/332 |
| 2006/0133462 A1* | 6/2006 | Nguyen et al. ............... 375/150 |
| 2007/0183535 A1* | 8/2007 | Maravic et al. .............. 375/316 |

FOREIGN PATENT DOCUMENTS

| | | | |
|---|---|---|---|
| WO | WO 2003019827 A1 | * | 3/2003 |
| WO | WO 2004/081601 | | 9/2004 |

OTHER PUBLICATIONS

Townsend, 1995, Novatel Communications ,L1 Carrier Phase Multipath Error Reduction Using MEDLL Technology, p. 1-6 http://www.novatel.com/Documents/Papers/File42.pdf.*

Smulders P F M et al: "A Statistical Model for the MM-Wave Indoor Radio Channel:"; Personal, Indoor and Mobile Radio Communications 1992; Proceedings PIMRC 92; Third IEEE International Symposium on Boston MA USA; Oct. 19-21, 1992; New York; pp. 303-307.

* cited by examiner

For fixed r scatterers lie on an ellipsoid

Large Time Limit r>>AB

Short Time Limit r->AB

METHOD OF POSITION DETERMINATION

DESCRIPTION

The present invention relates to a method of position determination in a radio system and to apparatus for position determination in a radio system.

European Patent Publication 0 654 677 A describes a method of processing a signal in a multi-path environment.

However, such methods may not perform particularly well in the presence of diffuse reflections especially when such components are very plentiful and closely spaced, as for example occur in indoor environments involving rough uneven surfaces and clutter. Accordingly, imprecise estimations and hence inaccurate positioning result.

An object of the present invention is the avoidance or elimination of diffuse multi-path inaccuracies.

Another object of the present invention is to provide good positioning accuracy.

Another object of the present invention is to remove diffuse scattering components from received signals.

According to the present invention, there is provided a method of position determination in a radio system, the method comprising correlating a signal received at a unit with a replica signal at the unit, and processing the correlated signal with an optimisation function comprising an exponential term in combination with a second term.

In this way, the method of the present invention may provide accurate position measurement in indoor environments.

Preferably, the exponential term is in the form $Be^{-\alpha t}$, and the second term is of the form:

$$\tau_o \sqrt{\left(1 - \frac{\tau_o^2}{t^2}\right)}.$$

The method may comprise effecting an integration with the replica signal, and/or fitting the optimisation function and a Line-of Sight correlation function with a set of parameters, and/or superposing the diffuse correlation output with a Line-of-Sight function output and fitting with correlation data of known values for the Line-of-Sight output.

The method may comprise first operating a multipath mitigation technique to effect correlation of the received and replica signals.

The multipath mitigation technique may comprise a Multipath Estimating Delay Locks Loop (MEDLL) technique, or a Minimum Mean Square Error (MMSE) technique.

According to the present invention, there is also provided a computer program product directly loadable into the internal memory of a digital computer, comprising software code portions for performing the method of the present invention when said product is run on a computer.

According to the present invention, there is also provided a computer program directly loadable into the internal memory of a digital computer, comprising software code portions for performing the method of the present invention when said program is run on a computer.

According to the present invention, there is also provided a carrier, which may comprise electronic signals, for a computer program embodying the present invention, and/or electronic distribution of a computer program product, or a computer program, or a carrier of the present invention.

According to the present invention, there is also provided apparatus for position determination of a radio system, the apparatus comprising means to correlate a signal received at a unit with a replica signal at the unit, and means to process the correlated signal with an optimisation function comprising an exponential term in combination with a second term.

The present invention is applicable to radio systems especially involving GPS and GSM networks, particularly in indoor environments and can be implemented in hardware and/or software.

In order that the present invention may more readily be understood, a description is now given, by way of example only, reference being made to the accompanying drawings in which:

FIG. 4 depicts the surfaces that diffusers lie on.

Figure 1:
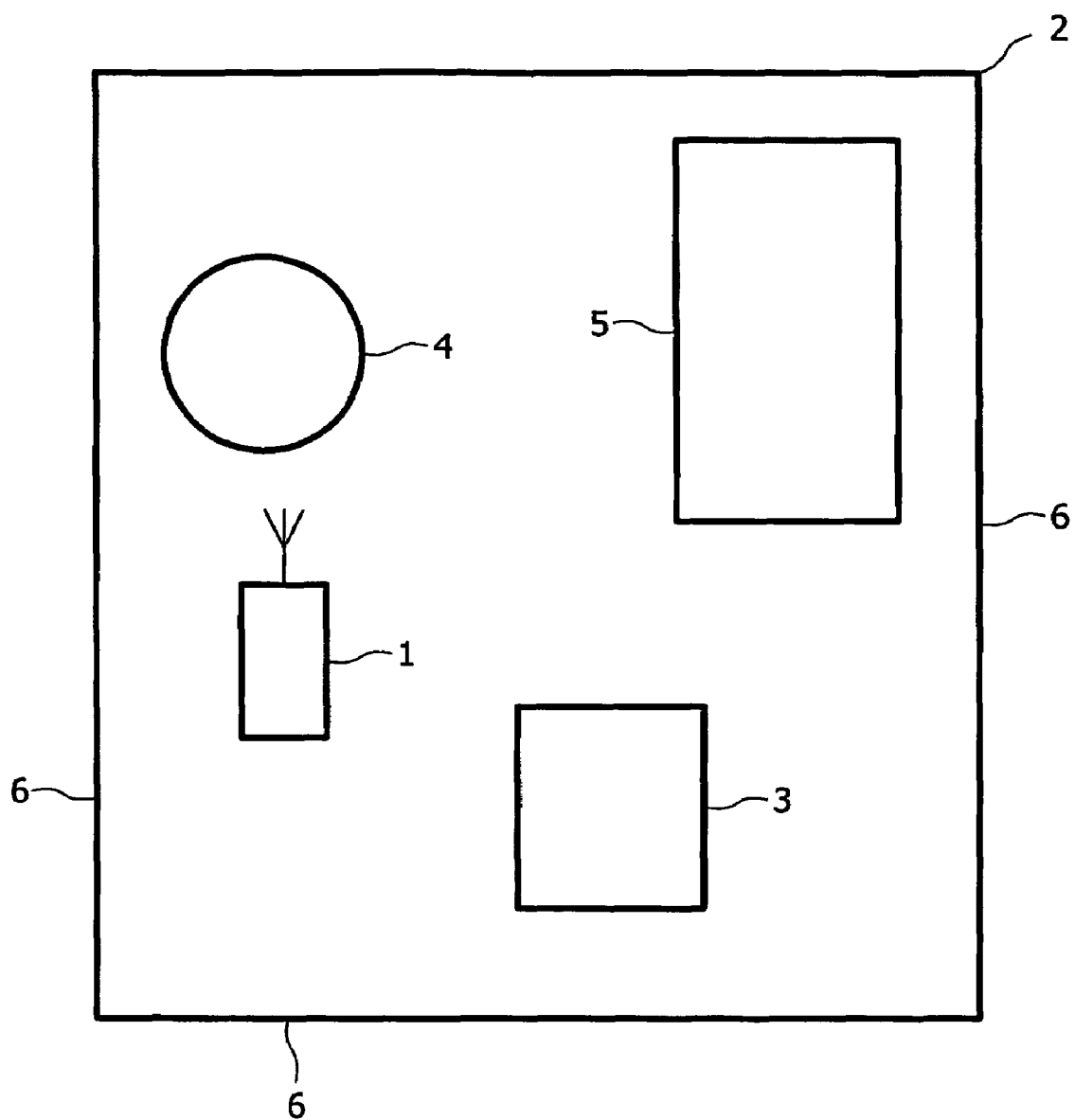
FIG. 1 is a schematic diagram of a receiver unit of the present invention.

FIG. 1 shows a mobile radio receiver unit 1 of the present is invention which is located in a room 2 with a variety of objects including chairs 3, desks 4, bookcase 5 and reflective surfaces e.g. walls 6. These objects act in combination to generate a large number of diffuse reflections for GPS signals of the type for reception at unit 1.

Figure 2:
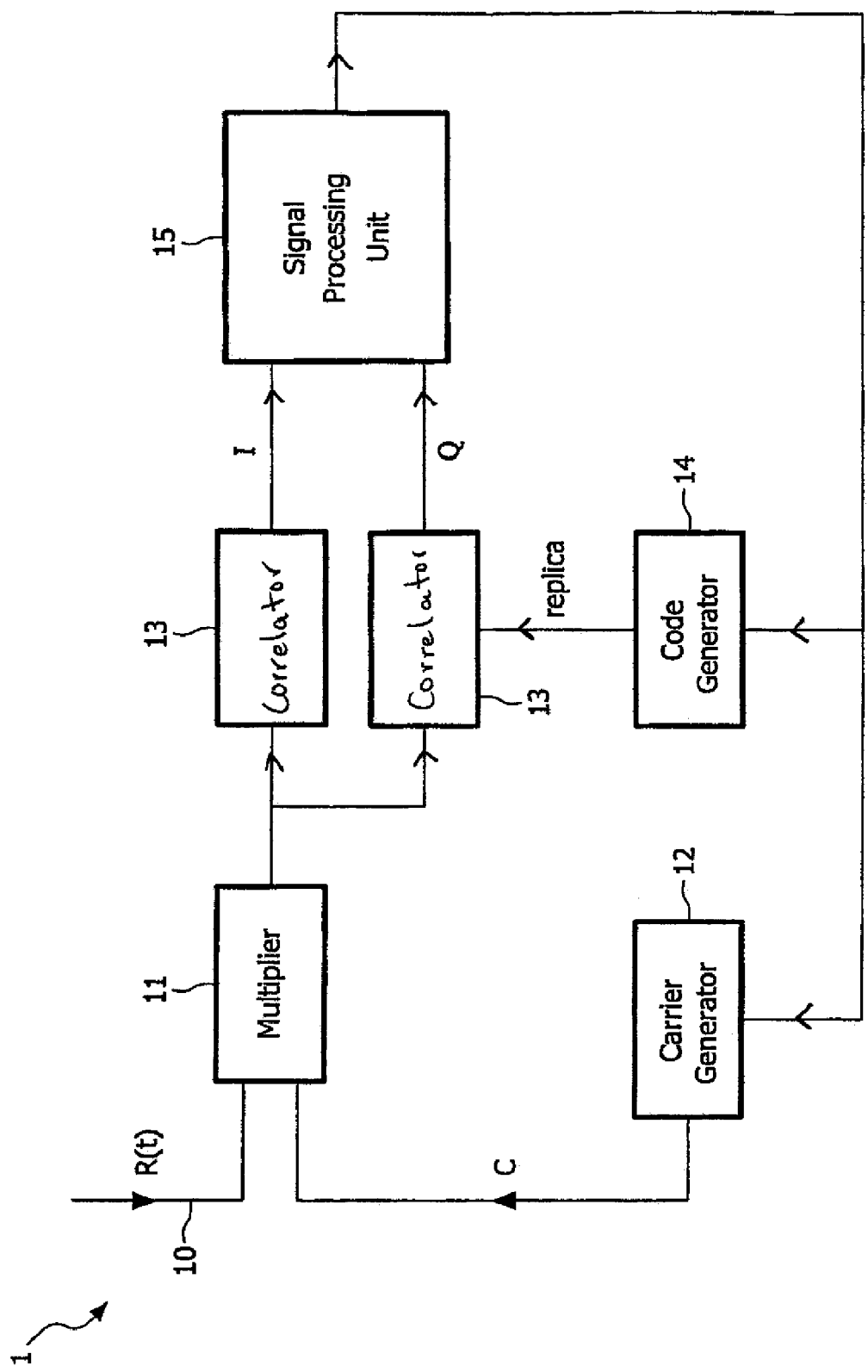
FIG. 2 is a hardware implementation of the unit of FIG. 1.

Details of the components in a hardware implementation of unit 1 are shown in FIG. 2, having an antenna 10 to receive incoming signal R(t) and pass it to multiplier block 11 for multiplication with output C from the carrier generator 12 in order to mix down signal R(t). The resultant signal is passed to a block of correlators 13 for sequential correlation of the mixed down signal and the replica code from code generator, in order to produce correlation data outputs from the I (imaginary) and Q (real) channels using input signals from code generator 14.

The correlation data is then passed to signal processing block 15 which adjusts appropriately both the code generator 14 and carrier generator 12.

Figure 3:
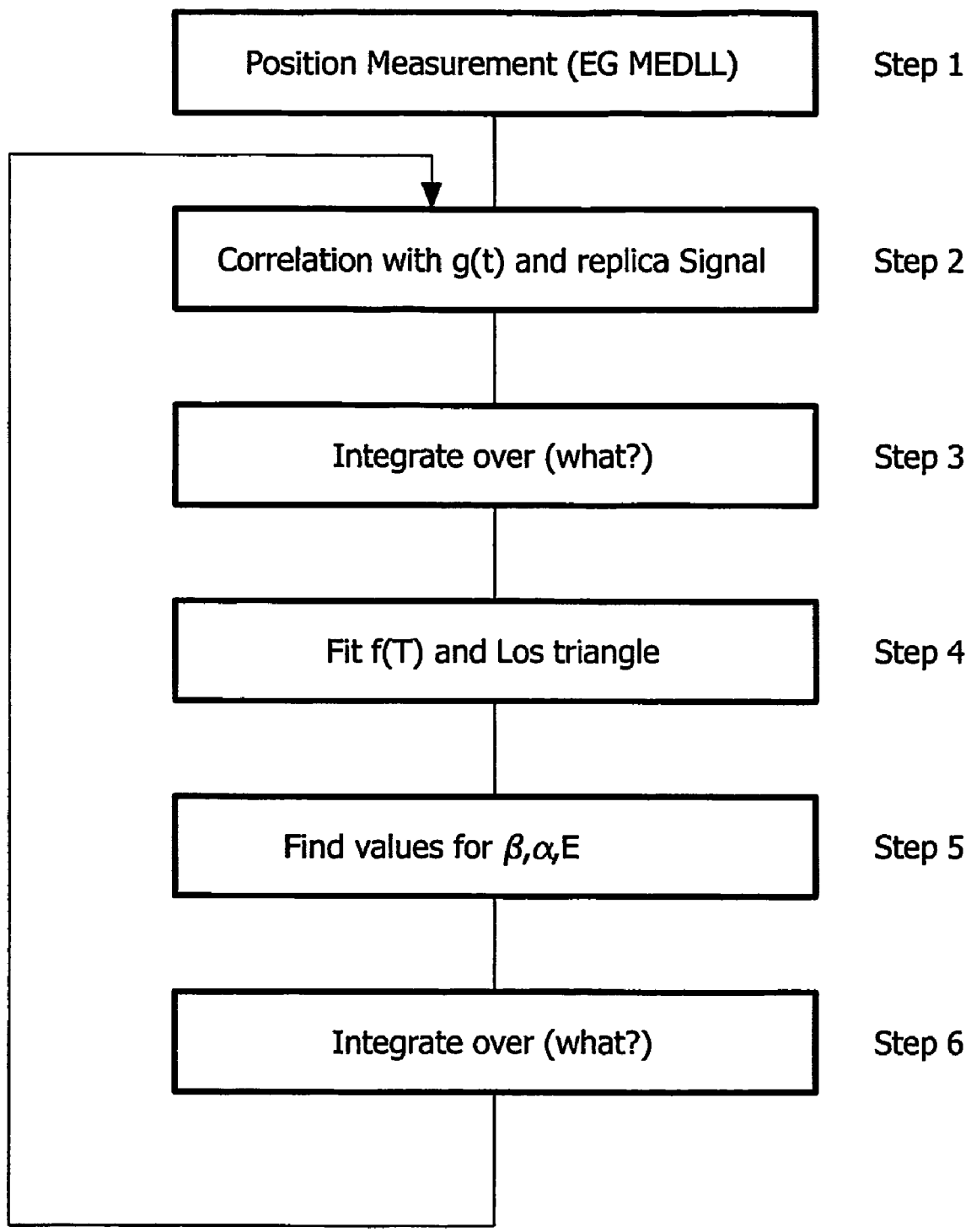
FIG. 3 is a flow diagram of the signal processing operation of the method of the present invention.

FIG. 3 is a flow diagram of the major steps in the correlation operation for signal processing to remove the diffuse components as in the present invention.

Step 1 of the flow diagram involves standard signal processing for position measurement in the presence of multipath signals, typically accomplished by the Multipath Estimating Delay Lock Loop (MEDLL) method generally as described in European Patent Publication No. EP 0 654 677 A.

Step 1 involves using this method to provide an optimal fit using N "triangles" thereby yielding estimates for the multipath parameters:

{a_0, ... a_N}

{t_1, ... t_N}

{q_1, ... t_N}

Then step 2 adds to the standard correlation operation by using the initial value for t_0 obtained from the MEDLL method, incorporating small initial values for B and α, and then correlating the function $$f(\tau) = Ba^{-\alpha t}\left(t_o \sqrt{1 - \frac{\tau_o^2}{t^2}} + 1\right) \quad (1)$$

with the replica signal s(t−τ).

The correlation is performed using multiplier block 11 so that the received signal r(t) is multiplied by the replica code on the carrier wave to mix down the received signal as well as obtain the correlation data. This is then summed by integrator 16 in Step 3 to give correlation function data for the I and Q channels, the correlation function being complex due to the phase of the signal.

In step 4, f(τ) is fit with the Line-of-Sight triangle with parameters

{a_0, t_0, q_0} to the correlation data using known values

{a_1, ... a_N}

{t_1, ... t_N}

{q_1, ... q_N} where $a_0, \ldots a_N$ are the amplitudes $\tau_0, \ldots \tau_N$ are the delays $q_0, \ldots q_N$ are the phases of all the reflected components in the received signals.

Step 5 involves finding values for

B,

α, a_0, q_0, t_0 and E (the mean square error), trying different values until a global minimum error is reached, and storing all the derived values.

Step 6 involves integrating the same operations for the respective values, and then feeding them back to Step 2 to reiterate the process.

Thus the function f(τ) which is characterized in equation (1) acts efficiently to clean the correlation functions of diffuse reflections.

As a variant, a software implementation of the correlation operation incorporates an algorithm to effect:

performing the correlation of the local replica code with the received signal data using multiplication and summation of the sampled values of the local code and the received signal, to produce demodulated correlation data;

operating the conventional position measurement method by fitting N amount of triangles of fixed width 2* chip width to the demodulated correlation data such that N triangles give the minimum global error; and operating the f(τ) of equation 1 and Stage 2.

In greater detail, FIG. 3 represents an additional stage of signal processing, in accordance with the present invention, for the purpose of cleaning a received correlation function of remaining diffuse reflection components for a number of multipath mitigation techniques, for example a Multipath Estimating Delay Lock Loop (MEDLL) or a Minimum Mean Square Error (MMSE) technique.

Although the method shown in FIG. 3 and the following description both refer to a MEDLL technique, it should be understood that the improvement to this technique described hereinafter is equally applicable to other forms of multipath mitigation technique, one example of which is a technique referred to as the Minimum Mean Square Error (MMSE) method.

The additional stage in the signal processing utilizes a cleaning function, ƒ(τ), in the maximum likelihood estimator (MEDLL) or Bayesian estimator (MMSE), making possible the removal of the diffuse scattered components from the received correlation function data.

The present invention allows for the optimisation of the implementation of a maximum likelihood estimator, using a novel correlation function that is a sum of a line-of-sight (LOS) correlation function and a diffuse correlation function, both of which are dependent on the LOS delay $\tau_0$.

The improved estimator utilizes an approximation of the diffuse scattering process.

The maximum likelihood estimator of a conventional MEDLL technique as currently in use is given by:

$$L \equiv \sqrt{\int \left[ D(\tau) - \sum_{n=0}^{N} a_n e^{i\theta_n} P(\tau_n) \right]^2 \cdot d\tau} \qquad (3)$$

where $$R(\tau) = \sum_{n=0}^{N} a_n e^{i\theta_n} P(\tau_n), \qquad (4)$$

and where $P(\tau_n)$ is a triangle of unit height centred at time $\tau = \tau_n$ with a base of two chip widths $2T_c$, phase of the nth reflection $\theta_n$, nth amplitude $\alpha_n$ and nth delay $\tau_n$ which are parameters in the correlation function model.

The term D(τ), where:

$$D(\tau) = \int r(t)s(t-\tau) \cdot dt, \qquad (5)$$

results from the received signal data, r(t), correlated with the replica signal, s(t), in the receiver to obtain the correlation function data.

Thus, the maximum likelihood estimator for the multipath parameters $\{\alpha_0 \ldots \alpha_N, \theta_0 \ldots \theta_N, \tau_0 \ldots \tau_N\}$ used in the MEDLL method is given by those parameter values that minimize the estimator L.

In deriving the f(τ) function of equation (1), three main factors were considered, namely:

i) the combined amplitude of randomly-scattered superposed rays as path length or time increases;

ii) the number of randomly-placed diffusers as path length or time increases; and iii) the free-space decay of ray amplitudes as path length or time increases.

In order to derive the form for the randomly-scattered superposed rays, mentioned in i) above, the diffuse reflectors are assumed to be homogeneously distributed since they can be viewed as scattering the rays from randomly placed locations. Moreover, at any given path length, all ray amplitudes are approximately equal, and so the random scattering is only manifested in the phases of individual received rays.

As time increases, the likelihood of any two received rays being in phase with one another is reduced, as rays with longer reflected paths are scattered further. Hence, the phases of individual rays of the same path length become increasingly divergent, and consequently, the amplitudes of the individual rays are more likely to cancel one another out upon superposition.

The exponential decay of the random-scattering effect is governed by the equation:

$$f(t) = Ae^{-t/b}, \qquad (6)$$

where t is the propagation delay of the rays. The constant b determines how quickly the function tends to zero. Since more re-radiation occurs at shorter wavelengths, the wavelength, $\lambda$, has the property:

$$b \propto \lambda.$$

Replacing b with the physical parameter $\lambda$ yields the following form for the random phase approximation of the received signal:

$$f(t) = Ae^{-kt/\lambda} \qquad (7)$$

where A is the amplitude of the transmitted signal.

In order to determine the number of diffusers with respect to time, mentioned in ii) above, it is assumed that each diffuser is a point homogeneously distributed in space. For any fixed path length for a signal transmitted from a transmitter, A, to a receiver, B, the reflectors must lie on the surface of an ellipsoid. Therefore, the number of reflectors N is proportional to the surface area of an ellipsoid with foci separated by the distance AB.

Figure 4:
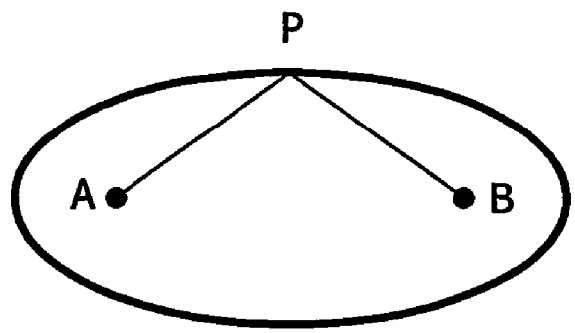
Figure 4:
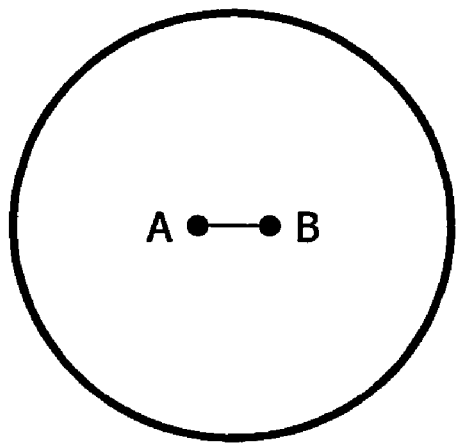
Figure 4:

FIG. 4 shows the surfaces that diffusers lie on for a fixed path length r, where rays travel from point A to point B. As r increases, the path from A to B becomes more haphazard due to the increased number of diffusers encountered.

An analytical expression for the surface area of an ellipsoid exists, but contains a complete elliptic integral of the second kind, which has to be evaluated numerically. However, an approximate analytical form for the surface area can be derived, having a more intuitive form. The approximation for the surface area of the ellipsoid must hold in the limits:

$$t \to cAB \text{ and } t \to \infty.$$

In the case of the surface area for the shortest reflection delay, which can equivalently be viewed as the surface area for AB $\to \infty$, the reflectors lie on the surface of a cylinder of area:

$$S = 2\pi bAB, \qquad (8)$$

where b is the minor axis of the ellipsoid.

Given that r is the reflected path length of a ray, then:

$$b = \sqrt{\frac{r^2 - AB^2}{2}}. \qquad (9)$$

Therefore, for $t \to cAB \to 0$, the number of reflectors is given by:

$$N(r) = S = \pi AB\sqrt{r^2 - AB^2}. \qquad (10)$$

In the case of the surface area for the longest reflection delay, which can equivalently be viewed as the surface area for AB $\to 0$, the reflectors lie on the surface of a sphere, which has the simple form:

$$N(r) = \pi r^2, \qquad (11)$$

where the path length r is twice the radius of the sphere.

Hence, the approximate form for the number of diffusers as a function of time is given by:

$$N(t) = \pi c \left[ t_{AB} \sqrt{t^2 - t_{AB}^2} + t^2 \right], \qquad (12)$$

where c is the speed of light, t is the duration for the received reflected rays to travel from A to B and $t_{AB}$ is the time for a ray to travel directly from A to B.

So, over time the number of diffusers increases when the surface they lie on evolves from a cylinder into a sphere. Thus, the number of received rays in time, and therefore the received signal, also increase by the factor N(t) due to the increased number of diffusers encountered by the rays.

However, as time increases the amplitudes decay in free space, as mentioned in iii) above, by the amount:

$$1/r^2 \qquad (13)$$

The effect of N(t) is reduced by free-space propagation decay to give the amount:

$$M(t) = \frac{\pi}{ct^2} \left[ t_{AB} \sqrt{t^2 - t_{AB}^2} + t^2 \right]. \qquad (14)$$

The effect of the three factors, i) to iii), of random-phase superposition, the number of diffusers, and free-space propagation decay, thereby combine to yield the following approximation for the diffuse components of the received signal:

$$f(t) = Ae^{-kt/\lambda} \frac{\pi}{ct^2} \left[ t_{AB} \sqrt{t^2 - t_{AB}^2} + t^2 \right]. \qquad (15)$$

This can be simplified to:

$$f(t) = Be^{-\alpha t} \left[ \frac{\tau_0 \sqrt{t^2 - \tau_0^2}}{t^2} + 1 \right], \qquad (16)$$

where $$B = \frac{\pi A}{c^2} \text{ and } \alpha = k/\lambda.$$

The diffuse approximation can be viewed as a background function for the received signal r(t), where specular reflections represented by the linear superposition signal basis can be superposed, resulting in the transformation of the MEDLL equation into the form:

$$r(t) = \sum_{m=0}^{M-1} a_m e^{i\theta_m} s(t - \tau_m) + Be^{-\alpha t} \left[ \frac{\tau_0 \sqrt{t^2 - \tau_0^2}}{t^2} + 1 \right]. \qquad (17)$$

As the diffuse scattering process is random, involves a large number of rays and exhibits an exponential decay, the above approximation provides a good characterization of the diffuse process.

The maximum likelihood estimator is given hereinbefore in Equation (1).

The present invention hereby provides an improved estimator, with the capability to clean the correlation function of diffuse reflections, given by the following equation:

$$M \equiv \sqrt{\int \left[ \begin{array}{c} D(\tau) - \sum_{n=0}^{N} a_n e^{i\theta_n} P(\tau_n) - \\ B \int e^{-\alpha t} \left( \tau_0 \sqrt{1 - \frac{\tau_0^2}{t^2}} + 1 \right) s(t - \tau) \cdot dt \end{array} \right]^2 \cdot d\tau} \qquad (18)$$

where s(t) is the replica signal, and B and α are free parameters. The other parameters all appear in the maximum likelihood estimator described hereinbefore.

The term $$f(\tau) = B \int e^{-\alpha t}\left(\tau_0\sqrt{1-\frac{\tau_0^2}{t^2}}+1\right)s(t-\tau)\cdot dt, \quad (19)$$

deriving from the approximation for the diffuse components of the received signal given in Equation (16), represents an improvement to the maximum likelihood (MEDLL) estimator.

FIG. 3 illustrates an example of the method by which the present invention may be implemented.

It will be apparent to a person skilled in the art that this method could be embodied in either software or hardware, for example as part of the signal-processing unit of a radio receiver.

The invention claimed is:

1. A method of position determination in a radio system, the method comprising the acts of:
    multiplying a signal received by a multiplier with a carrier signal from a carrier generator to form a mixed down signal;
    correlating the mixed down signal with a replica signal from a code generator to form a correlated signal;
    processing the correlated signal with an optimization function comprising an exponential term in combination with a second term to form an output signal that provides a position measurement in indoor environments with multiple diffuse reflections; and
    feeding back the output signal to control the carrier generator and the code generator for improving accuracy of the position measurement;
    wherein the exponential term is in the form $Be^{-\alpha t}$ and the second term is of the form:

$$\tau_o\sqrt{\left(1-\frac{\tau_o^2}{t^2}\right)}.$$

2. The method according to claim 1, further comprising the act of fitting the optimization function and a Line-of Sight correlation function with a set of parameters.

3. The method according to claim 1 comprising first operating a multipath mitigation technique to effect correlation of the received and replica signals.

4. The method according to claim 3, wherein the multipath mitigation technique comprises a Multipath Estimating Delay Locks Loop technique.

5. The method according to claim 3, wherein the multipath mitigation technique comprises a Minimum Mean Square Error technique.

6. A computer program product directly loadable into the internal memory of a digital computer, comprising software code portions for performing the method of claim 1 when said product is run on a computer.

7. A computer program directly loadable into the internal memory of a digital computer, comprising software code portions for performing the method of claim 1 when said program is run on a computer.

8. An apparatus for position determination of a radio system, the apparatus comprising:
    a carrier generator for providing a carrier signal;
    a multiplier for multiplying a received signal with the carrier signal to form a mixed down signal;
    means to correlate the mixed down signal with a replica signal and form a correlated signal;
    a code generator to provide the replica signal; and
    means to process the correlated signal with an optimization function comprising an exponential term in combination with a second term to form an output signal that provides a position measurement in indoor environments with multiple diffuse reflections;
    wherein the output signal is fed back to control the carrier generator and the code generator for improving accuracy of the position measurement;
    wherein the exponential term is in the form $Be^{-\alpha t}$ and the second term is of the form:

$$\tau_o\sqrt{\left(1-\frac{\tau_o^2}{t^2}\right)}.$$

9. The apparatus according to claim 8, further comprising means to fit the optimization function and a Line-of Sight correlation function with a set of parameters.

10. The apparatus according to claim 8, further comprising means to first operate a multipath mitigation technique to effect correlation of the received and replica signals.

11. The apparatus according to claim 10, wherein the multipath mitigation technique comprises a Multipath Estimating Delay Locks Loop technique.

12. The apparatus according to claim 10, wherein the multipath mitigation technique comprises a Minimum Mean Square Error technique.

* * * * *